Fig. 4

INVENTORS
Paul D. Agarwal
Robert B. Colten
Donald Friedman
Richard W. Johnston
John J. Werth

BY

*Albert H. Reuther*

Their Attorney

Fig. 5

May 30, 1967  P. D. AGARWAL ET AL  3,323,032
ELECTRIC DRIVE SYSTEM
Filed July 18, 1963  10 Sheets-Sheet 5

INVENTORS
Paul D. Agarwal
Robert B. Colten
Donald Friedman
Richard W. Johnston
John J. Werth

BY

*Albert T. H. Reuther*
Their Attorney

May 30, 1967 P. D. AGARWAL ET AL 3,323,032
ELECTRIC DRIVE SYSTEM
Filed July 18, 1963 10 Sheets-Sheet 9

INVENTORS
Paul D. Agarwal
Robert B. Colten
Donald Friedman
Richard W. Johnston
John J. Werth BY
*Albert H. Reutter*
Their Attorney

Fig. 12

INVENTORS
Paul D. Agarwal
Robert B. Colten
Donald Friedman
Richard W. Johnston
John J. Werth BY
Albert S. Reuther
Their Attorney

United States Patent Office 3,323,032
Patented May 30, 1967

---

3,323,032
ELECTRIC DRIVE SYSTEM
Paul D. Agarwal, Robert B. Colten, Donald Friedman, Richard W. Johnston, and John J. Werth, Santa Barbara, Calif., assignors to General Motors Corporation, Detroit, Mich., a corporation of Delaware
Filed July 18, 1963, Ser. No. 295,954
12 Claims. (Cl. 318—231)

This invention relates to a high performance electric variable speed drive system and, more particularly, to use of a squirrel cage specialized A.-C. induction motor means for traction and other applications.

An object of this invention is to provide a new and improved method of motor control which permits use of a specialized A.-C. induction motor means for traction and other applications and which is highly efficient and lighter in weight per horsepower over a wide range of speeds with torque substantially independent of speed subject to constant though adjustable slip speed control and use of variable frequency current to drive an A.-C. induction motor means having torque thereof matched to load torque by adjusting input voltage and/or controlling slip speed.

Another object of this invention is to provide, in combination, an electric drive system including a source of D.-C. power, a voltage switching means for variable voltage supply free of interruption of load current and arcing, a solid-state inverter means triggered differentially in response to a summation of frequencies of slip and rotor output speeds, and an A.-C. induction motor means having a high-speed squirrel cage rotor portion and stator portion electrically energizable to operate and produce torque matched to load torque requirements by adjustment of input voltage and/or control of slip speed with low weight per horsepower and with torque capability near maximum over the entire speed range.

Another object of this invention is to provide, specifically, improvements in control and operation of an A.-C. induction motor means having a high-speed squirrel cage rotor portion to have near maximum torque available over its entire speed range with high efficiency and low weight per horse power due to polyphase stator energization by a series of square wave pulses of predetermined time interval such that third harmonic and multiples thereof with associated losses are avoided during operation from a source of power with constant (though adjustable) slip speed irrespective of load and speed conditions without danger of overlooking though operating at close to maximum torque capacity.

A further object of this invention is to provide a voltage switching means for use in a variable speed drive system including a D.-C. source of power capable of supplying a plurality of differing voltage level contact elements engageable selectively by hybrid jointly movable switch arm means including a main current contact portion adapted to engage selectively a contact element complementary thereto as well as including a solid-state-type contact portion which supplements the main contact portion and is adapted to have current flow therein temporarily when the main current contact portion is disengaged between contact elements thereby to assure uninterrupted power supply without shorting between differing levels during switching operation, for example, to an impulse triggered inverter that can form relatively square wave rather than sinusoidal stator field energization of an A.-C. induction motor means operable at close to maximum torque capability at all times.

Another object of this invention is to provide a control means for operation of an A.-C. induction motor having a high-speed squirrel cage rotor portion as well as a multi-phase wound stator portion energizable by square wave electrical pulses to produce an electrically rotating stator field of which speed in space is always equal to that of the rotor portion plus adjustable slip frequency speed differentially added, for example, mechanically, electronically, electro-optically or electromagnetically to provide pulses to trigger semi-conductor means statically controlling formation of variable frequency square waves supplied as electrical power for a specialized A.-C. induction motor.

Further objects and advantages of the present invention will be apparent from the following description, reference being had to the accompanying drawings wherein preferred embodiments of the present invention are clearly shown.

D.-C. motor means as well as low frequency A.-C. commutator means have dominated the field of electric traction because of inherent speed torque characteristics and simplicity of control. The maximum speed of these in large ratings, however, has been limited to about 2,000 to 3,000 r.p.m. because of the structural and centrifugal limitations for commutators resulting in a large size and weight of about 10–15 pounds per horsepower. On the other hand, induction motors can be designed to operate at speeds of 10,000 r.p.m to 20,000 r.p.m. and higher resulting in small size and weight per horsepower. However, such motors operate at essentially constant speed requiring infinitely variable transmission means in addition to a large gearbox whereby the small size and weight per horsepower advantage of such induction motor means is minimized. Furthermore, a variable speed alternator has been required previously for efficient variation of speed of such induction motors by varying the frequency of a source of voltage supply.

Figure 1:
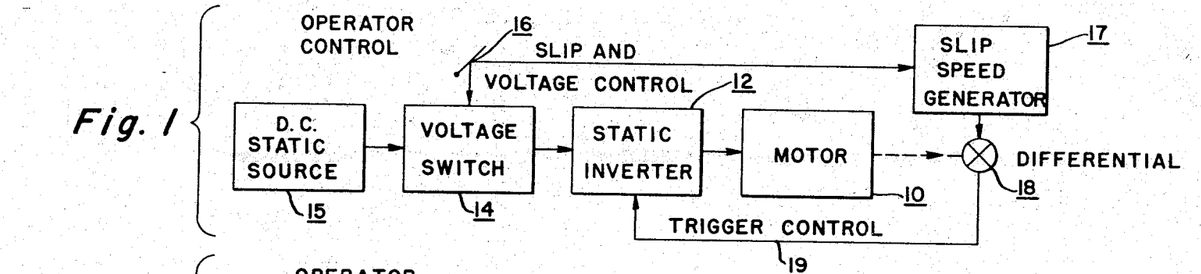
FIGURE 1 shows a block diagram of a system including a static D.-C. power source having features in accordance with the present invention.

FIGURE 1 illustrates in block diagram form a system in which a specialized A.-C. induction motor means generally indicated by numeral 10 can be adapted to deliver torque for traction drive and other applications. The induction A.-C. motor means 10 can have a polyphase stator winding portion as will become more apparent in the following description and electrical energization of this polyphase stator winding portion can be accomplished by way of static or semi-conductor inverter means generally indicated by numeral 12 in FIGURE 1. Normally, A.-C. induction motors are operated from sinusoidal voltage because of otherwise excessive harmonic losses expected when energizing voltage is non-sinusoidal. However, as will be illustrated and described further in this disclosure, it has been found that even with a single step square wave, efficiency is hardly affected so long as the square wave is such that third harmonic and multiples thereof are eliminated. Solid state or semi-conductor means comprising the static inverter generally indicated by numeral 12 can accomplish formation of such square wave signals subject to power supply from a hybrid voltage switch means generally indicated by numeral 14 which has predetermined contact structure for interconnection to differing voltage levels supplied from a D.-C. static source generally indicated by numeral 15. The hybrid voltage switch means 14 is subject to an operator control as represented by an interconnection generally indicated by numeral 16 such that the hybrid voltage switch means 14 varies voltage input to the single step static wave inverter means 12. In accordance with the present invention, there is simultaneously provided a slip speed generator means generally indicated by numeral 17 operable such that a controlled slip frequency is added to the rotor speed of the A.-C. induction motor means 10 through a differential means generally indicated by numeral 18 which is operative and interconnected as a trigger control represented by a line generally indicated by numeral 19 for appropriate signalling to the static inverter means 12.

Figure 2:
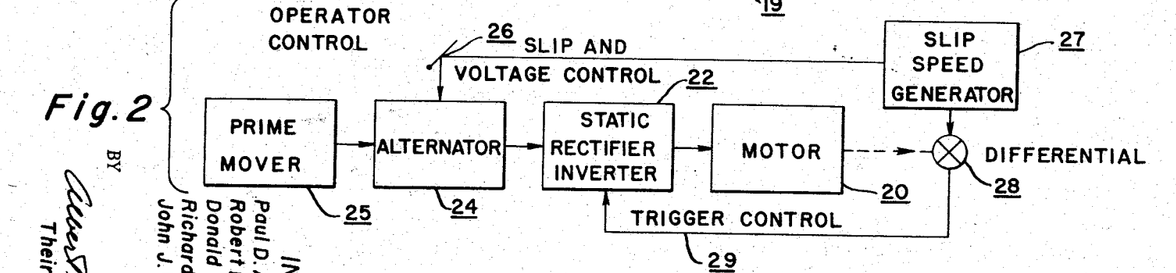
FIGURE 2 shows a block diagram of a system similar to that of FIGURE 1 except for use of a power source including a prime mover and alternator.

The D.-C. static source generally indicated by numeral 15 can comprise suitable battery means, a fuel cell or other electro-chemical device. Also, a high frequency alternating current and/or rectifier inverter means can be used as a power source. However, as illustrated by FIGURE 2, it is to be understood that an A.-C. induction motor means generally indicated by numeral 20 can also be supplied with energy from a static rectifier or inverter means generally indicated by numeral 22 by use of an A.-C. source or alternator generally indicated by numeral 24. This prime mover 25 can comprise a gas turbine or other suitable internal combustion engine as well as a fluid motor generally. Again there is provided a voltage control generally indicated by numeral 26 effective to vary output voltage from the alternator means 24 and to control a slip speed generator means generally indicated by numeral 27 having a slip frequency thereof delivered to a differential means generally indicated by numeral 28 effective to integrate slip frequency and motor speed into a summation of signalling to serve as a trigger control generally indicated by numeral 29. Thus, the single step wave inverter means such as 12 and 22 for energization of multiple stator winding portions of an A.-C. induction motor means such as 10 and 20 can be used with either D.-C. or A.-C. power sources.

Figure 3:
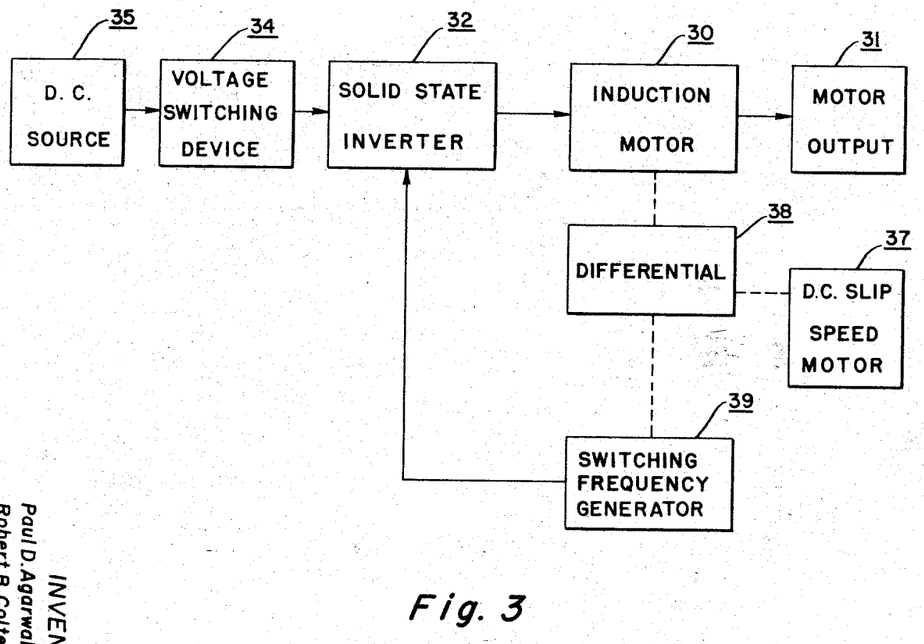
FIGURE 3 shows a block diagram of a system similar to that of FIGURE 1 though differing as to specific features including provision of a D.-C. slip speed motor, differential and switching frequency generator.
Figure 4:
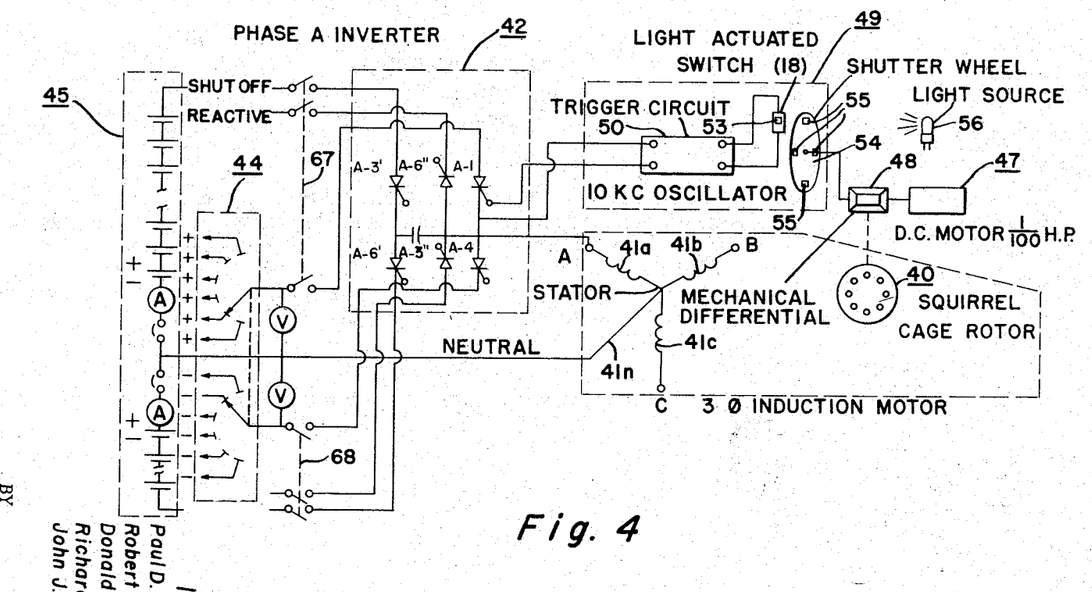
FIGURE 4 provides a circuit diagram and further details for the system of FIGURE 3.
Figure 5:
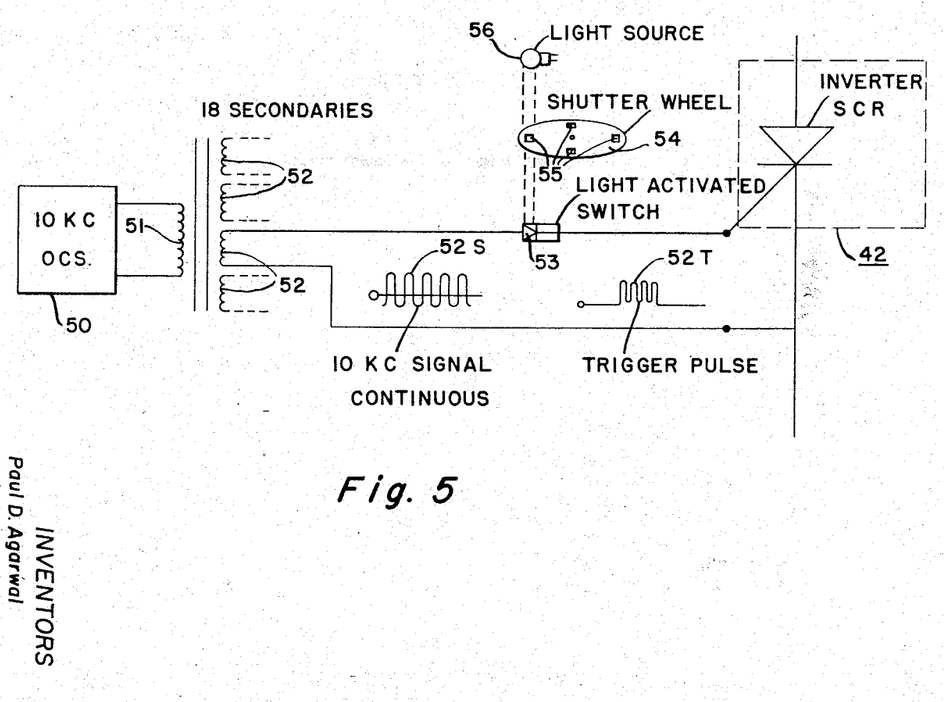
FIGURE 5 is an enlarged detail view of a trigger circuit for a system such as FIGURES 3 and 4.

A more specific block diagram is illustrated in FIGURE 3 wherein a specialized A.-C. induction motor means generally indicated by numeral 30 is provided to drive a load represented as motor output generally indicated by numeral 31. The A.-C. induction motor means 30 is electrically energized in a multi-winding stator portion thereof with square wave signals from a solid state inverter means generally indicated by numeral 32 supplied with differing increments of voltage by way of a voltage switching device or hybrid voltage switch means generally indicated by numeral 34 interconnected to a suitable D.-C. static source of power supply generally indicated by numeral 35. To generate a predetermined slip speed there is provided a D.-C. slip speed motor means generally indicated by numeral 37 which is energizable from the source 35 by way of the switching device 34 and which supplies a controlled slip frequency delivered to a differential means generally indicated by numeral 38 which summates slip frequency and motor speed to deliver a signal to a triggering means or switching frequency generator means generally indicated by numeral 39 in FIGURE 3. It is to be understood that the specialized A.-C. induction motor means generally indicated by numerals 10, 20 and 30 in FIGURES 1, 2 and 3, respectively, can have a polyphase winding such as three phase portions connectable in delta or Y configurations in a well-known manner. Also, the A.-C. induction motor means will include a squirrel cage rotor portion such as represented generally by numeral 40 in FIGURE 4 wherein Y-connected stator winding portions are represented by references 41a, 41b and 41c having a common juncture to which a neutral connection 41n is made. Free ends or ends of winding portions 41a, 41b and 41c are provided with terminal or contact means A, B and C, respectively, to which electrical energy is supplied from static rectifier or inverter means such as designated by reference numerals 12, 22 and 32 in the block diagrams of FIGURES 1, 2 and 3, respectively. For purposes of illustration, only a portion of the inverter means is illustrated by silicon control rectifier means or SCR devices totalling up to six in number for a phase A portion of inverter means outlined and generally indicated by reference numeral 42 in FIGURE 4. It is to be understood that for a three phase multi-winding stator portion there can be a total of eighteen such semi-conductor or SCR devices included in the inverter means 42 whereas only six such devices are illustrated for one phase A of the inverter means 42 in FIGURE 4. The function and firing sequence of a three phase arrangement of eighteen such semi-conductor devices or SCR means will be described more fully with reference to the showing of FIGURE 6 of the drawings wherein eighteen such devices are illustrated. A voltage switch means generally indicated by numeral 44 in FIGURE 4 provides incremental interconnection for supply of direct current power from a static D.-C. source generally indicated by numeral 45 in FIGURE 4. A D.-C. slip speed motor means generally indicated by numeral 47 in FIGURE 4 is provided such that a mechanical bevel-gearing differential means generally indicated by numeral 48 can summate speed of rotation of the squirrel cage rotor 40 of the three phase induction A.-C. motor means into an output frequency delivered by a suitable shaft connection to a triggering control generally indicated by numeral 49. Details of this triggering control means 49 can be seen in views of FIGURES 4 and 5 such that the triggering control includes an oscillator means 50 including a primary coil portion 51 as well as secondary portions 52. In accordance with the present invention, there is a total of such secondary portions 52 corresponding to the total of SCR or semi-conductor means in the static inverter portion such as 42 as generally indicated in views of FIGURES 4 and 6. When there are eighteen such SCR devices or semi-conductor means there are thus eighteen such secondary portions 52. These secondary portions 52 transmit continuous ten kilocycle or higher frequency signalling as designated by a reference numeral 52S in FIGURE 5 and for purposes of illustration, one completed circuit connection to one of the SCR devices or semi-conductor means of the inverter portion 42 is illustrated in FIGURE 5. The triggering means includes a light-activated switch means 53 as well as a shutter wheel or disc 54 which is driven by a suitable shaft connection from the differential means 48 mechanically connected thereto as represented in FIGURE 4. This shutter wheel 54 can have a total of four cutouts or openings 55 peripherally therewith such that light energy from a source such as a lamp bulb means 56 continuously powered can effect operation of the light-activated switch means 53 for a predetermined interval to supply an inverted triggering pulse represented by a reference 52T in FIGURE 5. This triggering pulse 52T represents inversion of A.-C. continuous signals from oscillator means 50. It is to be understood that, for example, on a ten kilocycle oscillator means a power rating of a few watts can be used to provide the triggering power for the inverter SCR devices. Numerous small-size capacitor means, inductor means as well as resistances (not shown in the drawings) can be used to reduce radio frequency spikes and interphase coupling due to switching transients. The shutter wheel can have equally spaced slits such as, for example, four slits spaced substantially 90° apart and mounted on or driven by a synchronous rotating shaft having a speed representing a summation of controlled slip speed from the D.-C. motor means 47 and rotor speed of the three phase induction motor. Gearing used in the differential means 48, for example, can be such that mechanical ratio used is such that the speed of the rotating magnetic field is different than the speed of the shutter wheel 55. The shutter wheel 55 permits light to fall or pass from an energized lamp means 56 onto light-activated switch means 53 as indicated in views of FIGURES 4 and 5. The light-activated switches are stationary and are mounted to one side of the shutter wheel 55 for each circuit interconnection between an SCR device and a secondary portion 52 of the oscillator means 50. These light-activated switches provide and control triggering sequence for the SCR devices of the inverter means 42. It is to be understood that the ten kilocycle value for operation of the oscillator means is given for purposes of illustration and that other values of kilocycle signalling can be utilized. For example, not only the ten kilocycle but also fifty kilocycle as well as one hundred kilocycle oscillator means may be used as a source of triggering power. In any event, the lamp bulb means 56 are suitably mounted to be adjustable in positioning thereof thereby allowing complete flexibility in timing adjustments for various SCR devices by simply moving the position of the small light-activated switches which can be mounted radially of the axis of rotation of the shutter wheel or disc means 54. When light falls on the light-activated switch means, there is a closing of internal contacts to allow positive peaks from the ten kilocycle oscillator means to be applied to the trigger input of an SCR device of the inverter means 42 as represented in FIGURE 5. When the shutter wheel cuts out the light, the next negative peak from the ten kilocycle oscillator means 50 opens the light-activated switch means and it stays open until light again falls thereon. The ten kilocycle signal can be generated by a transistor oscillator means requiring only one solid state or semi-conductor device therewith. The transformer means having the primary portion 51 and eighteen secondary portions 52 serves to separate the various trigger circuits for each of the semi-conductor or solid state means included in the inverter portion such as 42.

In accordance with the present invention, the speed of rotation of the shutter wheel means 54 represents a summation of required slip speed added to that speed of the induction motor through the mechanical differential such as 48. This, therefore, provides a shaft rotating at synchronous speed required to generate pulses for triggering the SCR devices of the inverter means. Also this produces a rotating magnetic field, the speed of which is always equal to the sum of the motor speed and slip speed being introduced through the differential means. In accordance with the present invention, the slip speed, and hence the rotor frequency, is controlled externally and is independent of the motor speed. The pulses that trigger the inverter means including the multiple SCR devices thereof determine the frequency corresponding to a speed which is the sum of the motor speed and the slip speed.

Figure 6:
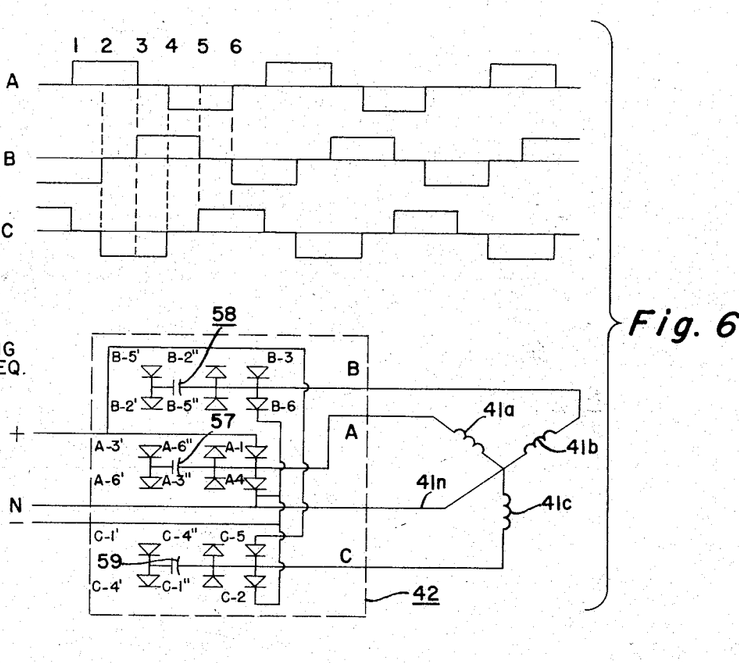
FIGURE 6 shows a firing sequence diagram of a triggering circuit in accordance with the present invention.

With reference to views of FIGURES 4 and 6, it is noted that there are six SCR devices or semi-conductor means adapted to formulate required square wave configuration for each of the three phases A, B and C. Accordingly, these six semi-conductor devices are identified by letter as well as by numerical designation according to the particular phase served thereby. In each phase there can be two semi-conductor devices without any prime designation and these serve to apply positive and negative voltage to a motor winding portion. Similarly, there are two semi-conductor devices for each phase having a single prime added to the reference designation thereof and representing "shut-off" means. Furthermore, there are two more semi-conductor devices having a double prime added to the reference designation thereof and these represent semi-conductor devices through which reactive power can be returned from the motor back to the power source if so desired. For descriptive purposes, the illustration of FIGURE 4 shows only the six semi-conductor devices that generate the required square wave for phase A and these six SCR devices or semi-conductor means are designated by reference numerals A–1, A–4, A–6″, A–3″, A–3′ and A–6′. These same reference designations are provided for the semi-conductor means or SCR devices for phase A in the views of both FIGURES 4 and 6. In addition, in FIGURE 6 there is a diagrammatic illustration of additional semi-conductor devices for each of the other phases, including semi-conductor means B–3, B–6, B–2″, B–5″, B–5′ and B–2′ for phase B. Similarly, for phase C there are six SCR devices or semi-conductor means shown in FIGURE 6 including those designated with references C–5, C–2, C–4″, C–1″, C–1′, C–4′.

The sequence of firing the semi-conductor devices for phase A shown in FIGURES 4 and 6 are such that power SCR device A–1 fires to apply positive voltage to motor winding portion 41a returning by the common juncture and neutral connection 41n. The SCR device A–3′ shuts off power of SCR device A–1. When the shut-off SCR device A–3′ is fired, it connects a commutating capacitor means 57 to positive shut-off voltage (FIGURE 4). This causes formation of an alternate path for motor winding load current and maintains it long enough for the power SCR device A–1 to shut off and also applies a negative voltage across the the power SCR device A–1 which speeds the shut-off action. It is to be recognized that the commutating capacitor means 57 is less charged positively toward the motor winding portion such as 41a at the end of the previous cycle and thereby provides proper polarity for shut-off action. Reactive return SCR device A–3″ when fired returns the reactive power from the motor means back to the power source. The triggering signal is applied before SCR device A–3′ is fired and is maintained during the shut-off interval. As the commutating capacitor means 57 discharges, it is no longer able to maintain load current, and reactive power in the motor winding portion 41a causes the winding voltage to reverse. When this reverse voltage exceeds the negative reactive return voltage level, it will cause this SCR device to conduct or fire. Thus, the current flowing through this SCR device is the reactive power being returned to the source. The reverse voltage across the motor winding will also charge the commutating capacitor means 57 negatively toward the motor winding portion 41a, thus leaving a charge of proper polarity required to shut off the power SCR device A–4 during the next half cycle which will be of negative polarity. As the commutating capacitor means 57 is being charged, the current through the shut-off SCR device A–3′ falls below its holding current value and it therefore turns off. Also, when the reactive current falls below the holding current value for the reactive SCR device A–3″, it no longer conducts and thus completes the positive half-cycle operation for phase A.

Six reactive return silicon control rectifier devices are provided to return negative energy back to the source. However, since this system operates at high power factor of about .9 or above, the negative energy to be returned is negligible. Therefore, the reactive return SCR devices can be eliminated without significant loss in efficiency during the forward operation of the motor. However, during regenerative braking, they would definitely be required. The power SCR devices will be switched to the opposite direction or reversed mechanically or electrically when dynamic or regenerative braking is required, thus eliminating the reactive SCR devices from the system without significant loss of efficiency.

Action to generate the negative half cycle of operation involve SCR devices A-4, A-6′, and A-6″. Their function is the same as the corresponding SCR devices designated without a prime, with a single prime and a double prime in the positive half cycle of operation except that they return to opposite polarity voltage. Phase B and C voltage waves are generated in exactly the same manner except that phase B is displaced from A by 120 electrical degrees and phase C by 240 electrical degrees. This timing sequence is represented clearly in an upper portion of FIGURE 6. Thus, the switching circuitry for generating th 120° square wave signals is the same for each winding portion of the three phase A.-C. induction motor means and consists of six silicon controlled rectifier means for each phase. The shutter wheel 54 generates a frequency which is the sum of the slip and motor rotor frequencies and this switching frequency controls the switching of the solid state devices in a manner to provide 120° square wave output signals, the frequency of which is equal to the switching frequency. Frequency of this output current determines motor speed if slip is held constant. In addition, however, motor torque must be matched to load torque by adjusting motor input voltage. The voltage switching means is generally indicated by reference numeral 44 in views of FIGURES 4 and 7 with the latter illustrating further details thereof. This switching means 44 permits change in voltage values or levels connected to the motor means from a static source without interrupting load current. Thus, the physical size of the switching means can be relatively small because no elaborate arc-suppressing features are required and each voltage step can be made in small increments. For example, a size of approximately five inches by five inches by two two inches is all that would be necessary for a 250 ampere, 15 position switch means. The switch means is so constructed that it cannot stop at an intermediate position between voltage values. The switch means generally indicated by numeral 44 can be seen in FIGURE 7 to include a plurality of fixed contact elements 60 engageable by a main contact portion 61 as well as a secondary contact portion 62 of a switch arm 63 journalled for pivotal movement about a point 64. A static rectifier means 65 such as a diode is provided in series with the secondary contact portion. Since the switch arm cannot stop at an intermediate position between voltage steps, the diode conduction time will only be a fraction of each switching operation time. Therefore, the current rating of the diode or static rectifier means 65 need be considerably less in value than the rating of the switch means generally. Also, the reverse voltage on the diode or static rectifier means is only the step voltage and not the total supply voltage thereby permitting use of relatively inexpensive diodes or static rectifier means with this switch assembly.

Figure 7:
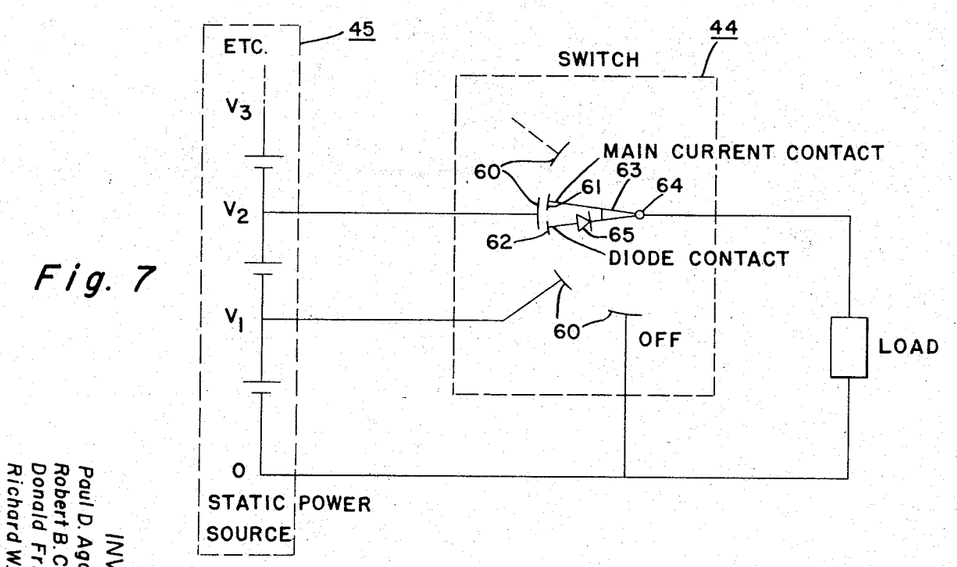
FIGURE 7 illustrates details of a voltage switch means in accordance with the present invention.

As to operation of the voltage switching means 44, reference can be made more particularly to FIGURE 7 of the drawings wherein the two electrical contact portions 61 and 62 can be seen. Both of these contact portions have winding engagement with contact elements 60 interconnected to differing portions of the static power source generally represented by reference numeral 45. The primary contact portion 61 carries "main" current whereas the secondary can be referred to as the "diode" contact. Spacing between the voltage level contact elements 60 is greater than that representing width of the main current contact or primary contact portion such that shorting between voltage levels or adjacent contact elements 60 is avoided during the switching operation. This voltage switching means permits obtaining of variable D.-C. voltage from a static D.-C. source of power without interruption, without appreciable loss of efficiency or loss of power while avoiding need for previously known bulky contacts or circuit breakers.

When the switch arm portion 63 is moved to effect transistion to a next higher voltage level, the following conditions are encountered. First, the electrical contact portions on the switch arm normally rest at a voltage level contact position as indicated in FIGURE 7. Then switching action begins and the switch arm portion 63 moves upwardly such that the primary or main current contact portion 61 disengages from the contact element of the lower incremental voltage. When the current stops flowing through the primary or main current contact portion 61, the current begins flowing through the "diode" or secondary portion of the switch arm 63. As the switch arm continues to move to the contact element for the next higher voltage, the primary or main current contact portion engages the contact element representing the next higher voltage level interconnection. When this contact or engagement is effected, the load current begins to flow with power supplied from the higher level contact element. The static rectifier or diode means is biased off and the circuit to the lower level is opened. The diode or static rectifier means 65 is biased off by voltage applied to it in reverse direction as the primary or main contact portion engages the next higher voltage contact element 60. The switch arm continues to move into engagement with the next higher voltage contact element until both electrical contact portions 61 and 62 are at the new voltage level contact element. This completes the switching action to a next higher voltage level without interrupting the load current.

When the switch arm 63 is to be moved to a next lower voltage level or contact element, the following conditions are encountered. The switch arm 63 starts a shift away from the contact element it has been engaging. The secondary or diode contact portion moves into engagement with the next lower voltage level while the diode or rectifier means 65 is still biased off. The switch arm 63 continues to move in a direction to effect downward evaluation of voltage and the primary or main current contact portion 61 disengages from the higher voltage level contact element 60. When the current stops flowing through the main or primary current contact portion 61, the current begins flowing through the secondary or diode section of the switch arm from the lower voltage level contact element 60. Thus, the maximum voltage that can appear during disengagement between contact elements 60 adjacent to each other is the increment or stop of voltage plus the diode drop. As the switch arm continues to move into engagement with the lower level voltage contact element, the primary or main current contact portion 61 engages the lower voltage level contact element also. The load current switches from the diode path to the main current contact path because of the diode voltage drop encountered in the secondary contact portion path. When the main current contact portion 61 comes to rest in a normally located positioning as to a particular contact element, this switching action is completed. It is to be understood that the hybrid voltage switching means per se can be used other than with remaining features of the present invention. In the circuit diagram of FIGURE 4 it is noted that the system is used with a center-tap battery supply requiring a double switch means. Suitable amp meters and volt meters can be added to the circuit of FIGURE 4 as indicated therein on either side of the voltage switching means 44.

Use of a hybrid voltage switching means 44 makes it possible to vary voltage applied to the inverter means 42 without circuit breakers or power interruption. This voltage switching means 44 makes it feasible to operate a specialized A.-C. induction motor means with a squirrel cage rotor from a static power source. For example, features of the present invention make it possible to operate motor means in day horsepower rating such as between 2 and 600 H.P. at rotor speeds up to 60,000 r.p.m. using only a single step wave inverter means having the SCR devices or semi-conductor means as indicated by reference numeral 42 as described earlier. Positive and negative voltage pulses can be applied to each phase by two power SCR devices such as A-1 and A-4, B-3 and B-6 as well as C-5 and C-2. Two additional SCR devices are required to turn off these power SCR devices through commutating capacitors indicated by reference numerals 57, 58 and 59 in FIGURE 6. Two more SCR devices are used to permit return of reactive power to the source optionally by way of two pairs of additional three-way switching devices having interconnections 67 and 68 between respective components thereof as indicated in FIGURE 4.

Figure 8:
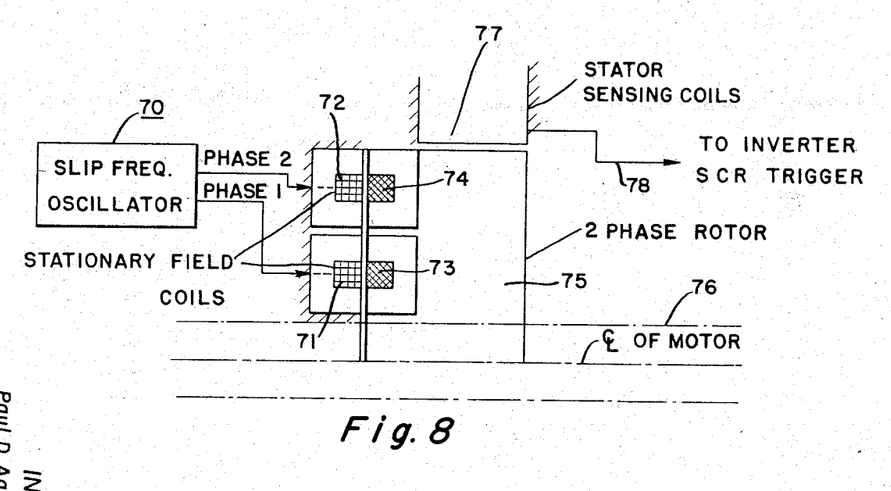
FIGURE 8 is a fragmentary view of an electromagnetic differential means in accordance with the present invention.

FIGURE 8 illustrates an electro-magnetic differential means and triggering system which can be used in place of the triggering circuit and system of FIGURE 5 requiring photoelectric components used in conjunction with a mechanical differential means 48 illustrated in FIGURE 4. In the electro-magnetic differential means a slip frequency oscillator portion generally indicated by numeral 70 can be provided to supply electrical energization of a first stationary field coil 71 as well as a second stationary field coil 72. These stationary field coils 71 and 72 represent phases one and two, respectively, from which electro-magnetic flux is caused to emanate subject to magnetic coupling at predetermined intervals with corresponding movable or rotating pick-up field coils 73 and 74 carried by a two-phase rotor means 75. The rotor means can be mounted on an extension of a main motor shaft indicated by numeral 76 in FIGURE 8. Pick-up coil means 77 can be provided radially outwardly from the two-phase rotor means 75 and an interconnection 78 can be provided to lead to the inverter means such as 42 having a plurality of solid state or silicon controlled rectifier devices therein as described earlier. Two voltages of slip frequency 90° out of phase with each other will be induced in the rotor means 75 from the stationary field coils 71 and 72 by rotating transformers in effect being a stationary exciter coil synchronous type generator with solid rotor. In any event, the two-phase voltages produce a rotating field which revolves with respect to the rotor at synchronous speed corresponding to the slip frequency introduced. Thus, a rotating field is obtained having a speed in space which is always equal to that of the rotor plus synchronous slip frequency speed. Pick-up coils in a location designated by reference numeral 77 in a stator opposite the two-phase rotor 75 will have the frequency required to trigger the semi-conductor means or silicon controlled rectifier devices of the inverter means described earlier. The stationary field coils 71 and 72 can be excited by a simple transistor oscillator as noted. Trigger power required to turn on a semi-conductor means or silicon controlled rectifier device is only a fraction of a watt, making the total power output of the two-phase system to be less than one watt.

Potential improvements offered by electric drive systems in accordance with the present invention include better braking, increased flexibility in location of components and increased vehicle ground clearance as well as more simple remote control, versatility in power plant selection, multi-purpose electric power source capability, easier field checking and servicing, and improved equipment mobility. It is desirable to have a drive system capable of delivering almost constant horsepower to the wheels for vehicle speeds ranging from between 2.5 to 50 miles per hour for wheeled vehicles and 2.5 to 30 miles per hour for tracked vehicles. Consequently, electric drives must provide either torque roughly inversely proportional to speed, or maximum horsepower substantially in excess of that required to meet the vehicle's top speed power requirement, or adequate multiple speed gearing or some suitable combination thereof. The system of the present invention provides precise speed control and thus permits elimination of clutches.

Constant horsepower over a wide speed range implies high relative torque at low speeds. For this reason, previously, traction motors for streetcars, railroad engines and automobiles have been series D.-C. motors. Such motors, although possessing high torque at low speed, are heavy and result in drives weighing 25–40 pounds per horsepower because maximum speeds are limited to a few thousand r.p.m. Physical arrangement and structural assembly of commutator and wound rotor components in such motors contribute to limitation of speed to only a few thousand r.p.m. Use of solid state components capable of handling high power permits overcoming such commutator and wound rotor speed limitations. Thus, an electric drive system in accordance with the present invention can utilize such solid state components in switching circuit having D.-C. or A.-C. current inputs and transforming them into A.-C. output to make electric motor means capable of high speed operation in a range between 12,000 and 24,000 r.p.m. with improved low speed torque characteristics. Such solid state systems can provide electric drive means weighing one-half or one-third of that of the D.-C. traction motors and the like subject to improved efficiency. The principal features of the electric drive system of the present invention include generation of 120° square wave A.-C. rather than conventional sinusoidal waves and a motor control system based on constant (but adjustable) slip speed between motor rotor and field. Use of the square wave A.-C. output to the motor means greatly reduces complexity of solid state circuitry required thereby resulting in increased overall system efficiency, reliability and decreased cost. The motor control system based on constant (but adjustable) slip speed between motor rotor and field provides easy starting of the high speed induction motor means under high load, operation over a wide speed range at high efficiency, and a simple method of adjusting power output to match load requirements. Efficiency can be slightly better due to operation at near full load and there is considerably less weight because slip speed control permits normal operation of the induction motor means much nearer the maximum torque capability thereof. An electric drive system through elimination of differential gearing and housing means thereof can reduce overall vehicle weight by hundreds of pounds. An electric drive system can provide greater flexibility in coupling prime movers such as internal combustion engines or high speed gas turbine means to the wheels and is believed to require less complex controls.

The D.-C. motor means and low frequency A.-C. commutator motor means have dominated the field of electric traction because of inherent speed-torque characteristics and simplicity of control. The maximum speed of these machines has been limited to about 2,000 r.p.m. because of the commutator which results in a large size and weight of about 10–15 pounds per horsepower. On the other hand, squirrel cage induction motor means can be designated and adapted to run at 10,000–20,000 r.p.m. with an accompanying small size and weight per horsepower. However, these squirrel cage induction motor means run at essentially constant speed requiring infinitely variable transmission in addition to a large gearbox. The control system in accordance with the present invention permits use of a high speed squirrel cage A.-C. induction motor means for traction applications with inherent advantages of light weight and efficiency as well as ease of control. This induction motor means is forced to operate with a constant (but adjustable) slip frequency which is introduced and controlled externally. Also, this induction A.-C. motor means operates from a simple system of components requiring only a single step 120° square wave inverter means without significant loss of efficiency as compared with operation from sinusoidal voltage. Such induction motor means can be powered from D.-C. as as well as A.-C. sources utilizing a simple rectifier inverter combination and complete speed as well as torque control can be obtained by voltage variation. Weight of the motor means with associated controls and cooling equipment will be about two or two and one-half pounds per horsepower and efficiency of such a motor-inverter combination will be substantially 90%. In contrast, in a standard induction motor means slip is controlled by the load torque primarily. This dictates that the standard induction motor means operates at about half of its maximum torque capability to prevent stalling on transient overloads. However, the specialized A.-C. induction motor means of the present system operates with constant (but adjustable) slip speed irrespective of load and speed conditions. Such a specialized A.-C. induction motor means therefore cannot be overloaded and can operate close to its maximum torque capability thus reducing the weight per horsepower. Increased output from the same frame size can result in an increase of heat to be removed. Thus, direct liquid cooling can be provided for adequate heat rejection capacity. Such motor means can have a low slip speed of 1% or less at rated output. This increases motor efficiency and reduces rotor losses and cooling requirements. In a normal induction motor operation, a low resistance rotor is impractical since it provides only low starting torque, high starting current and high sensitivity to frequency changes. No such problems exist in the features of the present invention. If the slip speed is kept constant and not adjusted, only the voltage applied to the inverter means need be controlled. For a given load torque, increasing the voltage increases the speed. An increase in load torque at a given voltage will decrease the speed which can be increased by raising the voltage. Thus, completed speed and torque control is provided by voltage variation. In a standard motor, power factor improves as slip increases from no load to full load. In the specialized induction on A.-C. motor means of the present disclosure, the power factor is high under all conditions and near the full load value. This means that little negative energy needs to be returned to the power source and therefore it is possible even for the reactive return silicon controlled rectifier devices to be eliminated without measurable loss in efficiency if regenerative operation is not required. The control system of the present invention can produce constant torque throughout the speed range. If the specialized induction motor means must be adapted to handle load variations without a variable speed transmission which can be accomplished by de-rating the motor, or in other words, using an over-sized motor, the control circuitry can provide constant horsepower without an increase in inverter component ratings. In other known systems, the ratings of the inverter components may need to be several times the constant horsepower requirement. The specialized squirrel cage induction motor means because of the ruggedness of its rotor portion, can rotate at high speeds so as to provide a motor of small size and weight per horsepower. The weight of a squirrel cage induction motor means at 12,000 r.p.m. is of the order of one pound per horsepower as compared to 10–15 pounds per horsepower for D.-C. machines. The motor runs with a small slip depending upon rotor resistance.

Normally, an induction motor means runs from a source of sinusoidal voltage. Due to physical layout of the windings in addition to the fundamental there are harmonic magneto motive forces in the air gap rotating at different speeds. These space harmonics produce a series of rotor harmonics. The fundamental alone produces the useful torque of a machine and the harmonics, in addition to producing additional losses under normal running conditions, also produce parasitic torques which can cause synchronous and asynchronous crawling in the low speed region. Previously, it has been generally assumed that if applied voltage is not sinusoidal, serious harmonic problems and loss in efficiency would result. Therefore, in applications where variable frequency is obtained by frequency converters or inverters attempts have always been made to obtain sinusoidal voltage output. For such sinusoidal voltage output, static inverters were provided to have increasing numbers of steps so as to cancel lower order harmonics and reduce the energy storage in filter components. This made such inverter circuits more complex, less efficient, less reliable and quite expensive. Furthermore, the poor performance of such inverters and converters handicapped use of induction motor means for traction applications.

It has been found that if only a single step inverter means with 120° positive and negative steps is used to power an induction A.-C. motor means, efficiency is reduced by only 0.3 or 0.4 percent as compared to operations with sinusoidal voltage. Such square wave steps also serve to eliminate third harmonic and multiples thereof. The fractional percentage of decrease in efficiency is based on ideal conditions, neglecting skin effect. At most, such factors would increase the reduction in efficiency to only 1%. In a normal induction motor of rated efficiency 90%, this would mean a 10% increase in losses and may present difficulty in heat removal from critical areas. However, the specialized induction A.-C. motor means is to have direct-liquid cooling and thus no problem in heat transfer is to be encountered. Simplicity, low cost and high reliability of a single step inverter means with little effect on motor efficiency is particularly advantageous.

By connection of motor winding means in delta, it is possible to eliminate the neutral connection thereto. Elimination of the neutral connection could permit use of motor power from one phase to turn off a power silicon controlled rectifier device in another phase. This would eliminate at least six shut-off silicon controlled rectifier devices and commutating capacitors together with their associated transient effects. The shut-off silicon controlled rectifier devices and commutating capacitors can also be eliminated by use of silicon controlled rectifier devices which can be turned off by applying a negative pulse of gate current just as they are turned on by applying a positive pulse of gate current. Such specialized silicon controlled rectifier devices are becoming available in higher ratings.

Since rectangular phase voltages are displaced in time by 120° with respect to each other, and the three-phase stator windings are displaced in space by 120°, the winding factor for all the harmonics is the same. In 120° wave form, no third harmonic or its multiple exists. The slip with respect to harmonics is close to unity and therefore harmonic equivalent circuits are essentially reactive. Harmonic copper loss is only a fraction of the fundamental copper loss, and has little effect on efficiency. Skin effect may increase such loss several times depending upon slot and conductor configurations. The magnitude of harmonic currents and hence their losses are essentially limited by the primary and secondary leakage reactances.

Features of the present invention make it possible to have maximum torque available over the entire speed range with high efficiency. Further advantages include the light weight and physical compactness of the components. There are no rotating contacts and therefore lower maintenance and higher reliability. Low slip induction A.-C. motors in a range between 0.5% through 1% have the following advantages when compared with average slip in a range between 3% and 6% for motor means:

(1) One through four percent higher efficiency.

(2) Rotor losses are a lower percentage of total motor losses so that motor cooling is facilitated since rotor losses increase at least in proportion to the ratio of the change in slip.

(3) Higher power output for a given volume of active material thus reducing motor weight.

The use of constant slip speed control eliminates difficulty such as low starting torque, high starting current and motor frequency sensitivity normally encountered as disadvantages with a low slip motor. In operation, motor control is facilitated because an operator can move a single control to adjust motor input voltage so that motor torque and load torque would match at a desired vehicle speed. Frequency of the power imput is automatically and simultaneously adjusted to desired rotor speed plus slip speed so that actual rotor speed will have the desired value. Features of the present invention are less complex and permit the motor means to be started at high load without requiring high rotor resistance which reduces efficiency at high speeds. By generating 120° square waves, losses due to third harmonic and multiples thereof are essentially eliminated so that motor efficiency is nearly as high as when operating on a sinusoidal imput. A key factor to realizing advantages noted is the provision for having an externally controlled slip for operating a specialized A.-C. induction motor means which is characterized as having a relatively high speed rotor portion therewith. Features of the present invention relating to external control of slip frequency can be incorporated in an induction motor drive from a variable frequency A.-C. power source. Thus, speed and torque of such a machine do not determine slip frequency as for a normal induction motor means. A.-C. power from a constant or variable voltage source as well as D.-C. power from a static source can be utilized to power an A.-C. induction motor means of any size from a single step inverter means without significant loss of efficiency. The voltage switch permits obtaining variable D.-C. voltage from a static D.-C. source without power interruption, without appreciable loss of efficiency or loss of power without requiring bulky contacts or circuit breakers. The voltage switch per se can be used to advantage in combination with components of this system and elsewhere. The system of the present invention uses constant horsepower and is distinguishable from operation of an A.-C. induction motor having constant ratio of voltage to frequency and no control of slip. In the system of the present invention there can be lower voltage to keep constant current and thus at most, a total of eighteen silicon controlled rectifier devices are used which can be much smaller at constant horsepower. There is no difference for constant torque requirements. There is an integration or summation of frequencies to maintain constant slip and the method of obtaining it advantageously from a D.-C. input requiring only one variable. Constant horsepower can be obtained all over the range of operation without requiring switching of stator windings or connections therebetween. The only control of speed is by voltage adjustment.

Use of a single step inverter for rectangular wave A.-C. powering is emphasized. A motor may operate reasonably well from 180° by square wave regardless of harmonics. Using 180° waves would definitely means some loss of efficiency and the 120° wave inverter is considered as a special case of the single step inverter.

Figure 9:
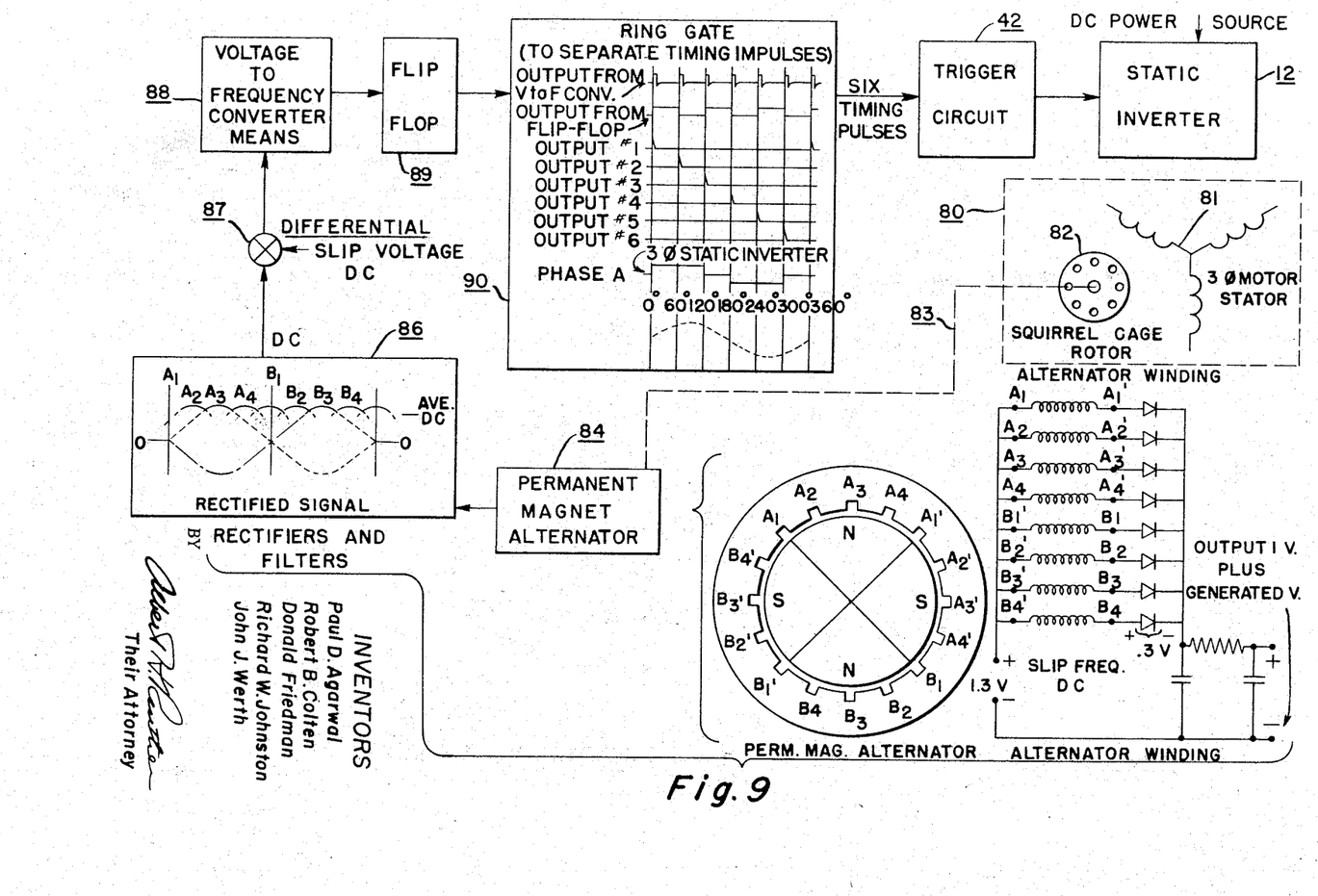
FIGURE 9 is a block diagram of an electronic trigger system for use in accordance with the present invention and FIGURE 9A shows a linearity curve for the rectified alternator output.
Figure 10:
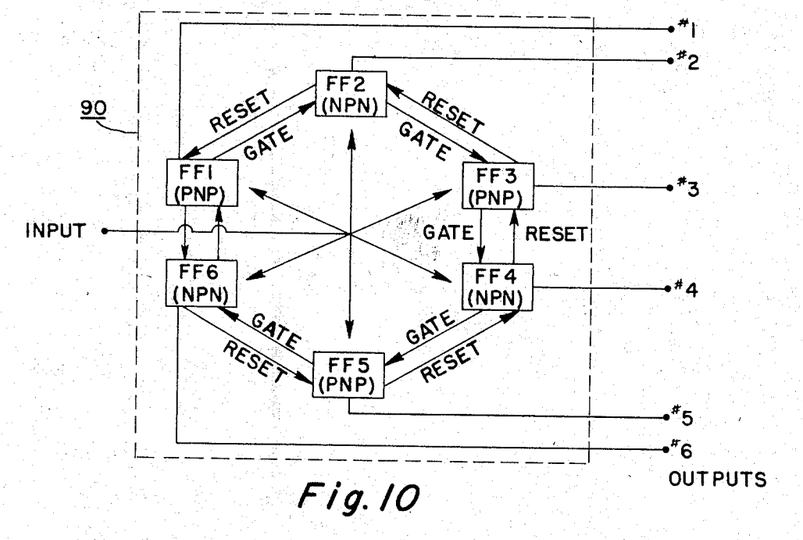
FIGURE 10 provides a block diagram of ring gate circuitry in FIGURE 9.
Figure 11:
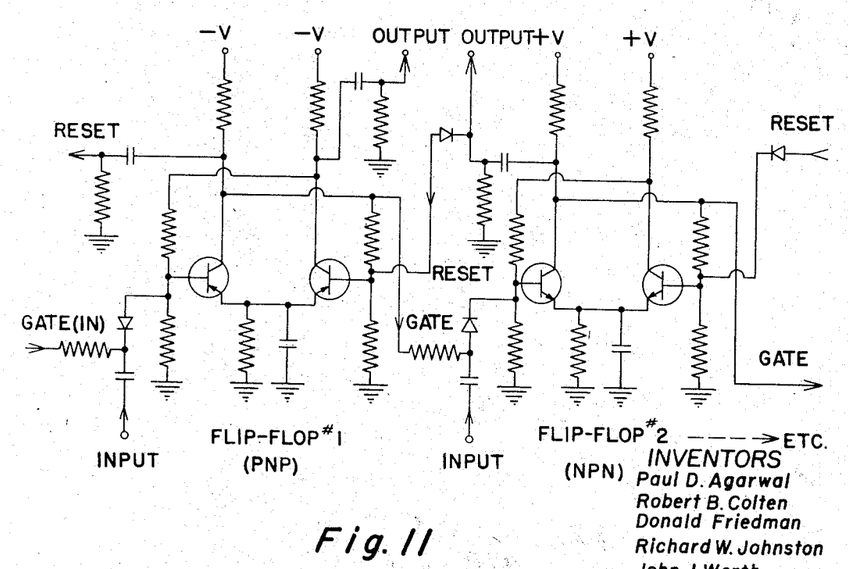
FIGURE 11 shows ring gate circuit details.

FIGURE 9 provides a block diagram of an electronic trigger system further in accordance with the present invention. A motor means generally indicated by numeral 80 is provided with a three-phase motor stator means having a Y-connected winding arrangement 81 and a squirrel cage rotor portion 82 with a shaft 83 on which there is mounted a permanent magnet generator means generally indicated by numeral 84. This permanent magnet generator has an alternator winding represented in the lower right corner of the view of FIGURE 9 and segments of this alternator winding are fitted into correspondingly labeled slots of an alternator stator portion thereof as represented adjacent to the alternator winding in FIGURE 9. This permanent magnet generator mounted on the motor shaft 83 generates an A.C. voltage which, when rectified and filtered, gives a D.C. voltage proportional to the speed of the motor shaft. To this a D.C. slip voltage is added and the sum is fed into a voltage to frequency converter means. Thus, the block diagram of FIGURE 9 further includes rectifier and filtering means generally indicated by numeral 86 and a representation of the resulting rectified signal is provided within the block for the rectifiers and filters generally indicated by numeral 86. This rectified signal is supplied to differential means generally indicated by numeral 87 of a type described earlier with slip voltage being added thereto such that the sum is fed into voltage to frequency conevrter means generally indicated by numeral 88. The voltage to frequency converter means 88 is calibrated to provide an output frequency six times that required to trigger inverter means. This is necessary since six timing pulses are required to generate one cycle in the inverter means such as illustrated in FIGURE 6 of the drawings noted earlier. The output of the voltage to frequency converter means is applied to a flip-flop circuit generally indicated by numeral 89. The output of the flip-flop circuit means is applied to a ring gate circuit generally indicated by numeral 90. The output wave shapes and timing chart are shown for the three circuits, "voltage to frequency converter," "flip-flop" and "ring gate," within the "ring gate" block numeral 90. Thus, the output from the voltage to frequency converter means supplied by way of the flip-flop means results in a square wave of half frequency. This is the desired wave shape to be applied to a ring gate means 90 having further details thereof as to circuitry shown by a block diagram of FIGURE 10. This ring gate means 90 includes semi-conductor devices as represented in FIGURE 10 and these devices are instrumental in generation of six separate output timing pulses from a single frequency source. Each block of the diagram of FIGURE 10 represents a "gated" transistor flip-flop circuit having the gate as a biased diode at the input to each circuit as shown in further detail in FIGURE 11. The semi-conductor means or transistors in the circuits are alternately PNP and NPN as represented in the views of FIGURES 10 and 11. This allows the collector voltages to be used directly as the gate voltage for the next circuit. It is necessary for a starting switch to present all circuits so that only one will accept an input pulse. When the first flip-flop is triggered, there are three resulting actions. The first action is generation of an output pulse. Second, there is an opening of the gate to the following flip-flop portion. Third, there is a reset of the preceding flip-flop portion so that its open gate will be closed. Thus, it is possible to separate six timing pulses from a single frequency source. If more than six timing pulses are required, the output frequency of the voltage to frequency converter means 88 and the number of flip-flop portions needs to be increased proportionally. Though ring-counter circuits are commonly used, the present ring-gate means 90 provides a unique operating arrangement.

Figure 9A:
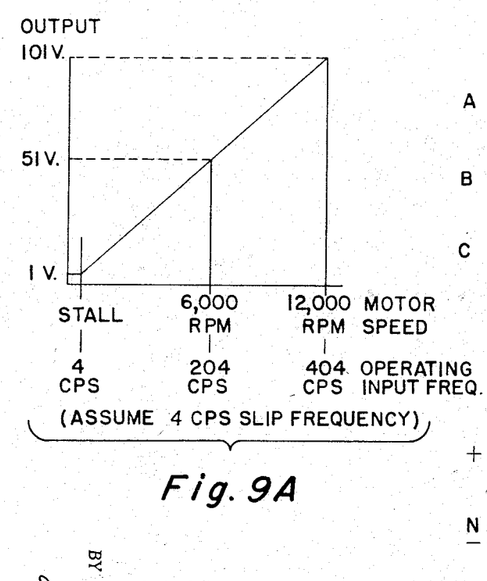

Features of the alternator-rectifier portions are illustrated in FIGURE 9. As noted earlier, the stator of the permanent magnet alternator is wound for a large number of phases so that voltage ripple, after rectification, is minimized thus reducing the size of the filter means. In some instances the filter means can be eliminated. Slip frequency D.C. voltage is added by way of a differential means 87 as noted previously. This allows adding a larger offset voltage to overcome diode barrier potential, thus giving or providing a D.C. output which will be more linear even down to very slow speeds. This linearity curve is illustrated separately in a view of FIGURE 9A.

Figure 12:
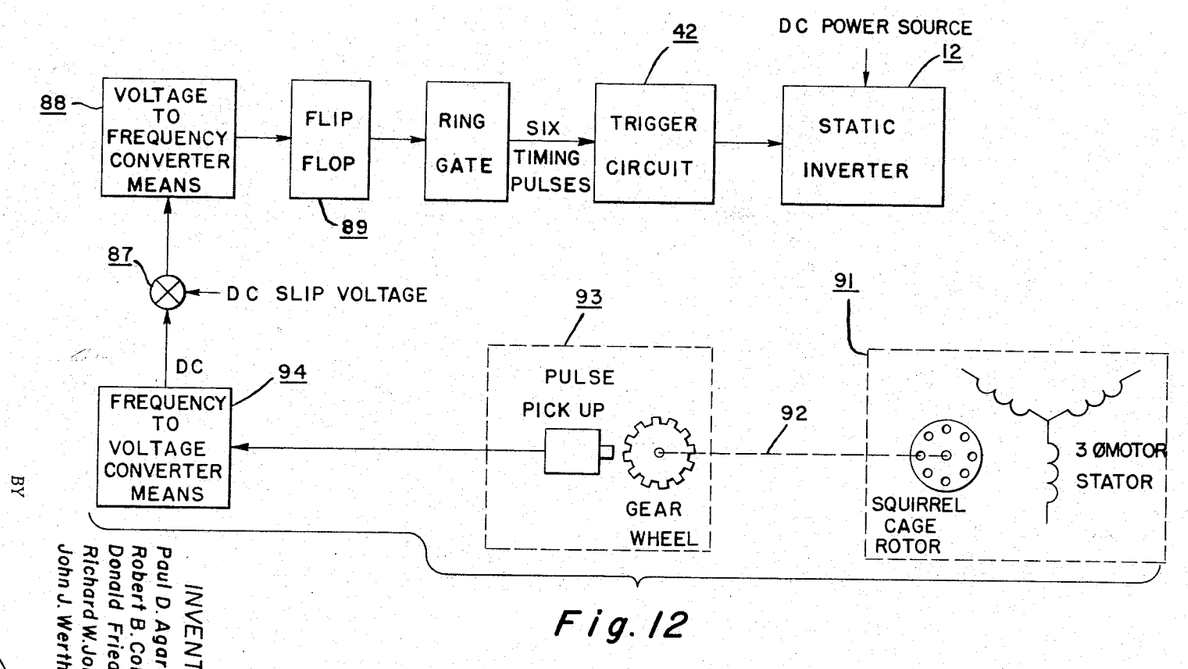
FIGURE 12 illustrates an alternate electronic trigger system similar to that of FIGURE 9.

FIGURE 12 illustrates an alternate arrangement to obtain a D.C. voltage proportional to the sum of rotor speed and the slip speed. Accordingly, there is provided a motor means generally indicated by numeral 91 having a stator and squirrel cage rotor means with a motor shaft 92 extending therefrom. A magnetic transducer or pulse pick-up device generally indicated by numeral 93 is used to pickup a frequency proportional to the speed of the motor shaft 92. A suitable toothed gear wheel and pulse pickup can be provided where previously the permanent magnet alternator means was used to obtain an A.C. voltage having an amplitude proportional to shaft speed. This motor shaft frequency is fed into a frequency to voltage converter means generally indicated by numeral 94 thus obtaining the D.C. voltage proportional to the shaft speed. Subsequent to this point, the system is the same as that illustrated by components previously noted and accordingly corresponding reference numerals are applied in the view of FIGURE 12 also.

In the electronic system a frequency which is proportional to the sum of the shaft speed and slip speed is given by the voltage to frequency converter means. Thus, in the arrangement of FIGURE 12 instead of going to a completely electronic ring gate circuitry, it is possible to use this frequency to provide a rotating field in a two-phase system which generates the necessary signals in properly placed pickup coils as in the case of the two-phase generator used in the electromagnetic differential system. However, this permits elimination of the two rotating transformers and in the two-phase generator, the inner member is also stationary.

In the electromagnetic differential trigger system, there is a feeding of two-phase power of about one watt into the rotor by rotating transformers. This avoids use of rotating contacts in this system. Since the power to be transferred is so small, it is to be noted that possibly three slip rings could be used for this purpose on the motor shaft. Such slip rings would not need to be more than an inch in diameter and one-sixteenth of an inch wide for each thereof. Such an arrangement permits considerable saving in weight though at the sacrifice of providing an actual rotating contact.

It is to be noted that the permanent magnet generator and/or the magnetic transducer means serve as signal pickup devices and thus are of extremely small size.

While the embodiments of the present invention herein disclosed constitute preferred forms, it is to be understood that other forms might be adopted.

What is claimed is as follows:

1. A drive mechanism operable at variable speed and torque from a D.-C. voltage source, comprising in combination: an A.-C. induction motor having a rotor with a low resistance squirrel cage winding and a stator having a three phase stator winding with three phase input terminals, the motor having an optimum torque and efficiency in relation to applied voltage in a predetermined range of slip speeds; a three part inverter unit, each part defining D.-C. input terminals connected to said voltage source and an A.-C. output terminal, said inverter parts each being successively operable (a) effectively to disconnect the D.-C. input terminals from the A.-C. output terminal (b) to connect the D.-C. input terminals in positive sense to the A.-C. output terminal, and (c) to connect the D.-C. input terminals in negative sense to the A.-C. output terminal; means connecting the A.-C. output terminals of the inverter parts to the three phase terminals of the stator winding, respectively; three phase cycling means operable in response to the rotor speed of said motor to actuate said inverter parts in successive disconnect, positive sense, disconnect, and negative sense repetitive cycles having a common repetition rate for each inverter and at substantially 120 degree phase spacings in relation to each other, the disconnect, positive sense, disconnect, and negative sense periods being respectively substantially 60 degrees, 120 degrees, 60 degrees, and 120 degrees; motor speed control means operable to vary the average values of the voltages at the output terminals of said inverter units during said positive sense and negative sense conditions at will and in unison; said motor speed control means being capable of varying the voltage at the output terminals of said inverter over a predetermined range of voltage provided by said voltage source, and means effective to actuate said cycling means at a repetition rate equal to the sum of the actual speed of said rotor and a predetermined slip frequency in said predetermined slip range without regard to the setting of said speed control means, thereby driving said motor at an average voltage and hence torque selected at will and at variable frequency with substantial elimination of third harmonic components in the voltage applied to the stator winding and energizing the motor at all times with efficiency comparable to that associated with balanced polyphase sinusoidal voltages and within the range of optimum efficiency and slip.

2. An electric drive system comprising, a polyphase induction motor having a polyphase stator winding and a rotor provided with a plurality of conductors defining low resistance closed circuit paths, said induction motor developing torque by current induced in the conductors of said rotor when said stator winding is energized and having maximum efficiency at a predetermined low slip, a source of electrical power, a control device including a plurality of switching devices having input terminals connected with said source of power and output terminals connected to the phase windings of said polyphase stator winding, cycling means connected with the switching devices of said control device for causing said switching devices to become conductive in a predetermined sequence to apply a polyphase current to said polyphase winding, the output voltage of each phase of said control device being a single step square wave, said cycling means causing said switching devices to switch in such a sequence that for a given phase of said stator winding said phase is energized with positive current for 120°, is deenergized for 60°, is energized with negative current for 120° and is then deenergized for 60°, a slip frequency control device, means coupled to said cycling means, to said slip frequency control device and to said induction motor for controlling the output frequency of said control device such that the output frequency of said control device is a function of the sum of motor speed and a slip frequency provided by said slip frequency control device, and voltage control means for varying the average voltage applied to said stator winding of said induction motor, said voltage control means being capable of varying the average voltage applied to said motor continuously over a predetermined range and independently of rotor speed over at least a part of the speed range of said motor.

3. An electric drive system comprising, an A.C. induction motor having a polyphase winding and a rotor, said motor developing torque by current induced in said rotor, said torque being a function of flux developed by said polyphase winding and the slip frequency of said motor, a source of electrical power, a control means connected with said source of electrical power and with said polyphase winding of said induction motor including a plurality of switching devices, a cycling means connected to said control means for determining the switching sequence of said control means, said switching devices of said control means when conductive connecting at least one of said phase windings of said A.C. induction motor with said power source whereby the voltage applied to said phase winding is a single step square wave of a duration and polarity that is a function of the switching sequence of said control means, said switching sequence as determined by said cycling means providing an output voltage from said control means which is a polyphase alternating single step square wave, slip frequency control means coupled to said A.C. induction motor and to said cycling means for controlling the frequency of the switching sequence of said control means in such a manner that the frequency of the voltage applied to said polyphase winding exceeds a frequency corresponding to actual rotor speed by a predetermined amount corresponding to the slip frequency of the motor, and voltage control means for varying the average voltage applied to said motor continuously over a predetermined voltage range, said voltage control means controlling the flux developed at varying speeds of said motor, said slip frequency control means controlling the rotor current of said motor at a given voltage and speed of said motor whereby the torque developed by said induction motor can be controlled over a predetermined speed range by setting the voltage applied to the motor and the slip frequency of the motor.

4. An electric drive system comprising, a polyphase A.C. induction motor having a polyphase winding, a source of electrical power having an output voltage wave form comprised of alternate positive and negative voltage envelopes of substantially 120° duration separated by 60° of substantially zero output voltage, a neutral connection for said polyphase winding, means connecting the phase windings and neutral connection of said polyphase winding with said power source whereby said phase windings are energized with said 120° wave form substantially eliminating third harmonic current flow in said motor, means for maintaining the slip frequency of said motor, said last-named means including means for controlling the frequency of the output voltage of said power source as a function of motor speed added to a desired slip frequency, and means for controlling at will the average voltage applied to said motor continuously over a predetermined range of voltage.

5. A motive power system for a vehicle comprising, a polyphase low resistance squirrel cage induction motor having an output shaft for delivering mechanical power to drive said vehicle against resistive forces, a source of D.-C. voltage, an inverter effective to connect said source to said motor in a polyphase manner, means for sensing the output speed of said motor, control means for said inverter operable in response to the output speed of the motor and effective to actuate the inverter at a frequency corresponding to said speed and a predetermined constant slip speed, whereby the slip frequency of said induction motor is held at a predetermined fixed value over a predetermined speed range of said motor, a manually operable voltage control means for determining the average A.-C. voltage applied to said motor from the inverter while said motor is operating at said fixed slip frequency, said voltage control means operable to adjust the voltage applied to said motor over an entire range of voltage by manual selection, said voltage control means being operable to set the voltage applied to the motor independently of the instantaneous output frequency of said control means over a predetermined speed range of said motor, said voltage control means operative to adjust the output torque developed by said motor whereby the speed of said vehicle can be controlled by varying the torque output of said motor in relation to load torque.

6. An electric drive system comprising, an A.C. induction motor having a winding and a rotor, said rotor including conductor means defining closed circuit paths, said induction motor developing an output torque by current induced in said rotor conductors from current supplied to said winding, a source of alternating current having a variable frequency output, means for connecting said source of alternating current with said windings of said induction motor whereby the frequency of the current supplied to said winding is determined by the output frequency of said source of alternating current, means for varying the output frequency of said source of alternating current as a function of motor speed, means for maintaining a fixed difference between the output frequency of said source of alternating current and a frequency corresponding to the actual rotor speed of said induction motor whereby the slip frequency of said induction motor is held substantially constant over a predetermined range of speeds of said motor and output frequencies of said source of alternating current, and means for controlling the torque output of said induction motor over said complete range of motor speeds and output frequencies of said source of alternating current, said last-named means including means for varying the voltage applied to said motor while said slip frequency is held constant and at any output speed of said induction motor within said predetermined range of speeds and output frequencies of said source of alternating current, said voltage control means being capable of increasing or decreasing the voltage applied to said motor independently of the instantaneous output frequency of said source of alternating current whereby said voltage control means is capable of accelerating or decelerating said motor depending upon the instantaneous load torque encountered and the voltage applied to the motor at constant slip frequency.

7. An electric drive system comprising, a polyphase induction motor having a polyphase stator winding and a rotor, said rotor carrying a plurality of conductors defining at least one closed circuit path, said induction motor developing a torque when current is induced in the conductors of said rotor when said polyphase winding is energized, said torque being a function of the flux developed by said polyphase winding and a function of the slip frequency of said induction motor, a control means having input terminals connected to a source of electrical power and output terminals connected with said polyphase winding, said control means including a plurality of switching devices, cycling means coupled to said control means for causing said switching devices to switch in a predetermined sequence to provide a polyphase energization of said polyphase winding, an adjustable slip frequency control means, means coupled to said slip frequency control means, to said motor and to said cycling means for maintaining the output frequency of said control means at a value which is a function of a summation of motor speed and slip frequency whereby the slip frequency of said induction motor can be controlled by adjustment of said slip frequency control means, and means for varying the flux developed by said polyphase winding, said last-named means comprising means for varying the voltage applied to said polyphase winding independently of the output frequency of said control means over a predetermined range of speeds of said motor and independently of the setting of said slip frequency control means.

8. An electric drive system comprising, an A.C. induction motor having a polyphase stator winding and a rotor, a source of direct current, a polyphase inverter connected between said source of direct current and the phase windings of said polyphase stator winding for controlling the frequency of the current supplied to said motor from said inverter, said inverter including a plurality of power controlled rectifiers, a plurality of turn-off switching devices and at least one commutating capacitor, said power controlled rectifiers when gated conductive connecting said phase windings periodically with said source of direct current, means connecting said switching devices with said phase windings of said motor, means connecting said commutating capacitor with a phase winding, with a turn-off switching device and with a power controlled rectifier, said turn-off switching device when conductive connecting said commutating capacitor in series between said source of direct current and a phase winding of said motor and completing a path for reverse current through a power controlled rectifier whereby said capacitor discharges and is then recharged through a phase winding to an opposite polarity when a turn-off switching device is rendered conductive, the discharge of said capacitor reverse biasing a power controlled rectifier to turn it off, cycling means coupled to said power controlled rectifiers and to said turn-off switching devices for causing said inverter to produce an alternating polyphase square wave output, means connected with said cycling means for controlling the output frequency of said inverter such that said output frequency is a function of the actual rotor speed of said motor added to a predetermined slip frequency, and means for controlling the output voltage of said inverter.

9. A motor control system for a polyphase induction motor having a three phase Y-connected stator winding and a squirrel cage rotor comprising, a source of direct current, a static solid-state inverter having input terminals connected with said source of direct current and output terminals connected respectively with the phase windings of said three phase stator winding, said inverter including a plurality of power controlled rectifiers for periodically connecting said phase windings with said source of direct current, cycling means connected with said power controlled rectifiers for causing said power controlled rectifiers to switch in such a sequence that the voltage applied to said stator winding is a polyphase alternating square wave voltage, means effective to actuate said cycling means at a repetition rate equal to the sum of the actual speed of said rotor and a predetermined slip frequency, a plurality of reactive return controlled rectifiers for returning energy to said source of direct current when a power controlled rectifier disconnects said source of direct current and one of said phase windings, said reactive return controlled rectifiers being cycled by said cycling means, and means for varying the voltage applied to said three phase winding of said induction motor.

10. A motor control system for a polyphase A.C. induction motor having a polyphase stator winding and a squirrel cage rotor comprising, a source of direct current, a static solid-state inverter connected between said source of direct current and said polyphase stator winding for supplying current to said stator winding from said source of direct current, said inverter including six silicon controlled rectifiers for each phase of said stator winding, said silicon controlled rectifiers being operative to connect and disconnect said source of direct current and said phase windings and operative to return reactive energy to said source of direct current when one of said controlled rectifiers is shut-off to disconnect a phase winding and said source of direct current, and a cycling means for cycling said controlled rectifiers of said inverter to provide an alternating square wave energization of said phase windings, said square waves for respective phase windings being displaced by substantially 120°, said cycling means including a transformer having a primary winding and a plurality of secondary windings, a circuit coupling each secondary winding of said transformer to the gate and cathode electrodes of said controlled rectifiers including a light activated switch device, means for energizing said light activated switch devices in accordance with a speed corresponding to the sum of the actual rotor speed of said motor and a desired slip frequency, and means for varying the average voltage applied to the phase windings of said induction motor.

11. A motor control system for an A.C. induction motor having a polyphase stator winding and a squirrel cage rotor comprising, a source of direct current, a static solid-state inverter connected between said source of direct current and the phase windings of said motor for applying a substantially square wave voltage to said polyphase stator winding to thereby provide an electrically rotating stator field for said induction motor, and means for controlling the output frequency of the inverter as a function of a frequency corresponding to the sum of the actual speed of the rotor of said induction motor and a predetermined slip frequency, said last-named means including a control device having a rotor driven by the rotor of said induction motor, said rotor having a polyphase winding magnetically coupled to a stationary polyphase winding which is energized by a slip frequency generator, said control device having a plurality of pick-up coils magnetically coupled to the polyphase winding of the rotor of said control device which develop voltages that are a summation of induction motor rotor speed and a frequency provided by said slip frequency generator, means coupling said pick-up coils to said solid state inverter, and means for varying the average voltage applied to the phase windings of said induction motor.

12. An electric drive system comprising, an A.C. induction motor having a three phase Y-connected stator winding and a rotor, a source of direct current, a solid-state inverter connected between said source of direct current and said phase windings of said three phase winding, means connecting the neutral of said Y-connected three phase winding with said source of direct current, said inverter including six controlled rectifiers for each phase of said three phase winding, two of said power controlled rectifiers providing means for connecting and disconnecting said source of direct current and said phase windings and two other of said controlled rectifiers being operable to provide a discharge path for a commutating capacitor for turning off the power controlled rectifiers, the other pair of controlled rectifiers providing a path for returning reactive energy to said battery, cycling means for cycling said controlled rectifiers of said inverter in accordance with a summation of actual rotor speed and a desired slip frequency, and means for varying the average voltage applied to said three phase winding through said inverter.

References Cited

UNITED STATES PATENTS

| | | | |
|---|---|---|---|
| 2,717,349 | 9/1955 | Lee | 318—237 X |
| 2,784,365 | 3/1957 | Fenemore | 318—231 X |
| 2,896,143 | 7/1959 | Bekey | 318—231 X |
| 3,023,348 | 2/1962 | Cox | 318—138 |
| 3,164,760 | 1/1965 | King | 318—231 X |
| 3,170,107 | 2/1965 | Jessee | 321—61 |

ORIS L. RADER, *Primary Examiner,*

G. FRIEDBERG, G. Z. RUBINSON,
*Assistant Examiners.*